(12) United States Patent
Choi et al.

(10) Patent No.: US 9,560,063 B2
(45) Date of Patent: Jan. 31, 2017

(54) APPARATUS AND METHOD FOR DETECTING MALICIOUS DOMAIN CLUSTER

(71) Applicant: ELECTRONICS AND TELECOMMUNICATIONS RESEARCH INSTITUTE, Daejeon (KR)

(72) Inventors: Changho Choi, Goyang-si (KR); Brent ByungHoon Kang, Daejeon (KR); Sungryoul Lee, Daejeon (KR); JungMin Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1 day.

(21) Appl. No.: 14/735,579

(22) Filed: Jun. 10, 2015

(65) Prior Publication Data

US 2016/0294859 A1  Oct. 6, 2016

(30) Foreign Application Priority Data

Mar. 30, 2015 (KR) ........................ 10-2015-0044016

(51) Int. Cl.
*G06F 11/00* (2006.01)
*G06F 12/14* (2006.01)
(Continued)

(52) U.S. Cl.
CPC ........... *H04L 63/1425* (2013.01); *G06F 21/00* (2013.01); *G06N 99/005* (2013.01); *H04L 61/1511* (2013.01)

(58) Field of Classification Search
CPC .......................... H04L 63/1425; G06N 99/005
(Continued)

(56) References Cited

U.S. PATENT DOCUMENTS 8,566,928 B2 * 10/2013 Dagon .............. H04L 29/12066
726/22
8,661,544 B2 * 2/2014 Yen ................... H04L 29/12066
726/24
(Continued)

FOREIGN PATENT DOCUMENTS

KR    10-2010-0084488 A    7/2010
KR    10-2011-0004101 A    1/2011
(Continued)

OTHER PUBLICATIONS

Leyla Bilge et al., "Exposure: Finding Malicious Domains Using Passive DNS Analysis," NDSS, 2011.
(Continued)

Primary Examiner — Dede Zecher
Assistant Examiner — Dereena Cattungal
(74) Attorney, Agent, or Firm — LRK Patent Law Firm (57) ABSTRACT

An apparatus and method for detecting a malicious domain cluster. The apparatus for detecting a malicious domain cluster includes a domain name server (DNS) data collection unit and a malicious domain cluster detection unit. The DNS data collection unit collects DNS traffic over a network, and stores the DNS traffic in a database. The malicious domain cluster detection unit generates a domain cluster based on the DNS data, learns the characteristics of normal and malicious clusters in the domain cluster, and detects whether the domain cluster is malicious based on the result of the learning.

16 Claims, 3 Drawing Sheets

(51) Int. Cl.
  *G08B 23/00* (2006.01)
  *H04L 29/06* (2006.01)
  *G06N 99/00* (2010.01)
  *G06F 21/00* (2013.01)
  *H04L 29/12* (2006.01)

(58) Field of Classification Search
  USPC .......................................................... 726/23
  See application file for complete search history.

(56) References Cited

U.S. PATENT DOCUMENTS

| | | | |
|---|---|---|---|
| 8,826,438 B2* | 9/2014 | Perdisci | G06F 21/56 |
| | | | 709/236 |
| 9,356,942 B1* | 5/2016 | Joffe | H04L 63/1408 |
| 2006/0146816 A1* | 7/2006 | Jain | H04L 63/1408 |
| | | | 370/389 |
| 2006/0253584 A1* | 11/2006 | Dixon | G06Q 30/02 |
| | | | 709/225 |
| 2012/0042381 A1* | 2/2012 | Antonakakis | H04L 63/1483 |
| | | | 726/22 |
| 2016/0217029 A1* | 7/2016 | Yoon | G06F 11/0751 |

FOREIGN PATENT DOCUMENTS

| | | |
|---|---|---|
| KR | 10-2012-0092286 A | 8/2012 |
| KR | 10-2014-0035678 A | 3/2014 |

OTHER PUBLICATIONS

Hyunsang Choi et al., "Botnet Detection by Monitoring Group Activities in DNS Traffic," ICCIT, 2007.

Jehyun Lee et al., "GMAD: Graph-based Malware Activity Detection by DNS traffic analysis," Computer Communication, 2014, pp. 33-47.

Manos Antonakakis et al., "Building a Dynamic Reputation System for DNS," Usenix Security, 2010.

* cited by examiner

APPARATUS AND METHOD FOR DETECTING MALICIOUS DOMAIN CLUSTER

CROSS-REFERENCE TO RELATED APPLICATION

This application claims the benefit of Korean Patent Application No. 10-2015-0044016, filed Mar. 30, 2015, which is hereby incorporated by reference herein in its entirety.

BACKGROUND

1. Technical Field

Embodiments of the present invention relate generally to an apparatus and method for detecting a malicious domain cluster and, more particularly, to an apparatus and method for detecting a malicious domain through cluster-based machine learning.

2. Description of the Related Art

Korean Patent Application Publication No. 2014-0035678 entitled "Learning-based DNS Analyzer and Analysis Method" discloses a method of detecting each malicious domain by monitoring domain name server (DNS) traffic as a conventional method for detecting a malicious domain. In this method disclosed in Korean Patent Application Publication No. 2014-0035678, malicious domains are individually detected. According to the method disclosed in Korean Patent Application Publication No. 2014-0035678, however, some of malicious domains that are collectively used may not be detected.

Korean Patent Application Publication No 2010-0084488 entitled "Apparatus and Method of Searching for Group Activity Malicious Code" discloses a method of searching for group activity malware based on the group activities of hosts infected with malware. In this method disclosed in Korean Patent Application Publication No. 2010-0084488, all types of traffic, exhibiting group activities, other than traffic included in a white list, are determined to be malicious. The method disclosed in Korean Patent Application Publication No. 2010-0084488 is problematic in that it is vulnerable when new traffic, not included in a white list, occurs.

Korean Patent Application Publication No. 2012-0092286 entitled "Method and System for Detecting Botnets using Domain Name Service Queries" discloses a method of detecting Botnets using domain name service query data. In this method disclosed in Korean Patent Application Publication No. 2012-0092286, a domain relation graph is generated by taking into consideration a domain query sequence. However, according to the method disclosed in Korean Patent Application Publication No. 2012-0092286, if malicious domains are newly used and formed into a graph, whether the domains are malicious cannot be determined until some of the domains are included in a black list.

"EXPOSURE: Finding Malicious Domains Using Passive DNS Analysis" (Leyla Bilge, Engin Kirda, Christopher Kruegel, and Marco Balduzzi) published in NDSS in 2011 suggests a method of detecting domains involved in malicious behavior using a passive DNS analysis scheme. In this method, however, as in Korean Patent Application Publication No 2014-0035678, malicious domains are individually detected, but some of malicious domains that are collectively used may not be detected.

"Botnet Detection by Monitoring Group Activities in DNS Traffic" (Hyunsang Choi, Hanwoo Lee, Heejo Lee, Hyogon Kim) published in ICCIT in 2007 suggests a method of detecting Botnets by monitoring DNS traffic. In this method, however, as in Korean Patent Application Publication No 2010-0084488, all the domains, exhibiting group activities, other than domains included in a white list are determined to be malicious, but this method is problematic in that it is vulnerable when new traffic, not included in a white list, occurs.

Moreover, "Graph-based Malware Activity Detection by DNS traffic analysis" (Jehyun Lee, Heejo Lee) published in Computer Communication Volume 49, Pages 33-47 on April, 2014 suggests a method of detecting malicious behavior by considering a DNS query sequence. In this method, however, as in Korean Patent Application Publication No. 2012-0092286, a domain relation graph is generated by considering a DNS query sequence. However, if malicious domains are newly used and formed into a graph, whether the domains are malicious cannot be determined until some of the domains are included in a black list.

SUMMARY

At least some embodiments of the present invention are directed to the provision of an apparatus and method for detecting a malicious domain cluster, which group malicious domains, which are collectively used, into a cluster and then detect and analyze the cluster.

At least some embodiments of the present invention are directed to the provision of an apparatus and method for detecting a malicious domain cluster, which are capable of overcoming a conventional problem in which some of the malicious domains that are collectively used may be missed because the characteristic of an individual malicious domain is detected through machine learning.

At least some embodiments of the present invention are directed to the provision of an apparatus and method for detecting a malicious domain cluster, which are capable of solving a problem, in which it is difficult to determine whether a cluster, including only domains that have not been used, is malicious if the cluster, including only the not-used domains, is generated because whether a cluster including malicious domains that are collectively used is malicious is determined based on only an existing black or white list even when the malicious domains are grouped into the cluster, using a method of machine-learning the characteristics of malicious and normal clusters.

In accordance with an aspect of the present invention, there is provided an apparatus for detecting a malicious domain cluster, including: a domain name server (DNS) data collection unit configured to collect DNS traffic over a network and store the DNS traffic in a database; and a malicious domain cluster detection unit configured to generate a domain cluster based on the DNS data, learn the characteristics of normal and malicious clusters in the domain cluster, and detect whether the domain cluster is malicious based on the result of the learning.

The malicious domain cluster detection unit may be configured to include: a clustering module unit configured to generate the domain cluster by grouping domains, exhibiting group activities, into the domain cluster based on the DNS data; a labeling module unit configured to assign a malicious or normal cluster label to the generated domain cluster; a characteristic extraction module unit configured to extract a cluster characteristic different with respect to the malicious and normal clusters based on the generated domain cluster; a learning module unit configured to learn the malicious and normal clusters based on the cluster label and the cluster characteristic; and a detection module unit configured to detect whether the domain cluster is malicious based on the result of the learning of the learning module unit.

In order to group the domains, exhibiting group activities, into the domain cluster, the clustering module unit may be configured to represent each of the domains in the form of a list of IP addresses of hosts that have queried the corresponding domain for a specific period, calculate the similarities of the host IP address lists of the domains, and group domains having similar host IP address lists into a cluster.

In order to assign the cluster label, the labeling module unit may be configured to check whether the domains of the domain cluster are malicious based on domain labels via an external domain evaluation service.

The labeling module unit may be configured to assign a cluster label to the domain cluster based on the domain label and a cluster classification criterion.

The labeling module unit may be configured to consider a corresponding domain to be a malicious domain if the domain label is indicative of danger and consider a corresponding domain to be a normal domain if the domain label is indicative of safety.

The labeling module unit may be configured to determine a cluster classification criterion defining that the domain cluster is a malicious cluster to be satisfied if a specific percentage or more of the domains of the domain cluster are malicious domains and then assign a corresponding cluster label to the domain cluster.

The labeling module unit may be configured to determine a cluster classification criterion defining that the cluster domain is a malicious cluster if a preset minimum or larger number of malicious domains are included in the domains of the domain cluster and a normal domain is not present to be satisfied and then assign a corresponding cluster label to the domain cluster.

The labeling module unit may be configured to determine a cluster classification criterion defining that the cluster domain is a normal cluster if a specific percentage or more of the domains of the domain cluster are normal domains to be satisfied and then assign a corresponding cluster label to the domain cluster.

The labeling module unit may be configured to determine a cluster classification criterion defining that the domain cluster is a normal cluster if a preset minimum or larger number of normal domains are included in the domains of the domain cluster and a malicious domain is not present to be satisfied and then assign a corresponding cluster label to the domain cluster.

The characteristic extraction module unit may include: a domain age extraction module unit configured to extract the average of domain ages within the domain cluster and the standard deviation of the domain ages as a characteristic item; a domain popularity extraction module unit configured to extract the average of domain popularities within the domain cluster and the standard deviation of the domain popularities as a characteristic item; a resolved IP address extraction module unit configured to extract the resolved IP addresses of the domains of the domain cluster as a characteristic item; and a domain link extraction module unit configured to extract the average of web page links indicative of the domains of the domain cluster and the standard deviation of the web page links as a characteristic item.

The learning module unit may be configured to update a rule for the detection of a malicious domain cluster by continuously learning a newly generated domain cluster.

The DNS data collection unit may be configured to extract only DNS traffic data from network traffic and store only DNS data obtained by processing the DNS traffic data in the database.

The DNS data may include the times at which a domain query and response are made, a hash value anonymously generated using a client IP address used to query a domain, a queried domain name, a domain response type, a domain response value, and the time to live (TTL) value of the domain.

In accordance with another aspect of the present invention, there is provided a method of detecting a malicious domain cluster, including: collecting, by a DNS data collection unit, DNS traffic over a network and storing, by the DNS data collection unit, the DNS traffic in a database; generating, by a malicious domain cluster detection unit, a domain cluster based on the DNS data; learning, by the malicious domain cluster detection unit, the characteristics of normal and malicious clusters in the domain cluster; and detecting, by the malicious domain cluster detection unit, whether the domain cluster is malicious based on a result of the learning.

The method may further include, between generating the domain cluster and learning the characteristics: assigning, by the malicious domain cluster detection unit, a malicious or normal cluster label to the generated domain cluster; and extracting, by the malicious domain cluster detection unit, a cluster characteristic different with respect to the malicious and normal clusters based on the generated domain cluster; and learning the characteristics may include learning the malicious and normal clusters based on the cluster label and the cluster characteristic.

Assigning the cluster label may include: checking whether domains within the domain cluster are malicious based on domain labels via an external domain evaluation service; and assigning the cluster label to the domain cluster based on the domain labels and a cluster classification criterion.

Assigning the cluster label may include assigning a cluster label corresponding to a malicious cluster to the domain cluster if a specific percentage or more of the domains of the domain cluster are malicious domains or if a preset minimum or larger number of malicious domains are included in the domains of the domain cluster and a normal domain is not present.

Assigning the cluster label may include assigning a cluster label corresponding to the normal cluster to the domain cluster if a specific percentage or more of the domains of the domain cluster are normal domains or if a preset minimum or larger number of normal domains are included in the domains of the domain cluster and a malicious domain is not present.

Extracting the cluster characteristics may include extracting the average of domain ages within the domain cluster and the standard deviation of the domain ages, the average of domain popularities within the domain cluster and the standard deviation of the domain popularities, the resolved IP addresses of the domains within the domain cluster as a characteristic item, and the average of web page links indicative of the domains within the domain cluster and the standard deviation of the web page links as characteristic items.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall, within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In the following description of the present invention, in order to facilitate the general understanding of the present invention, like reference numerals are assigned to like components throughout the drawings and redundant descriptions of the like components are omitted.

Figure 1:
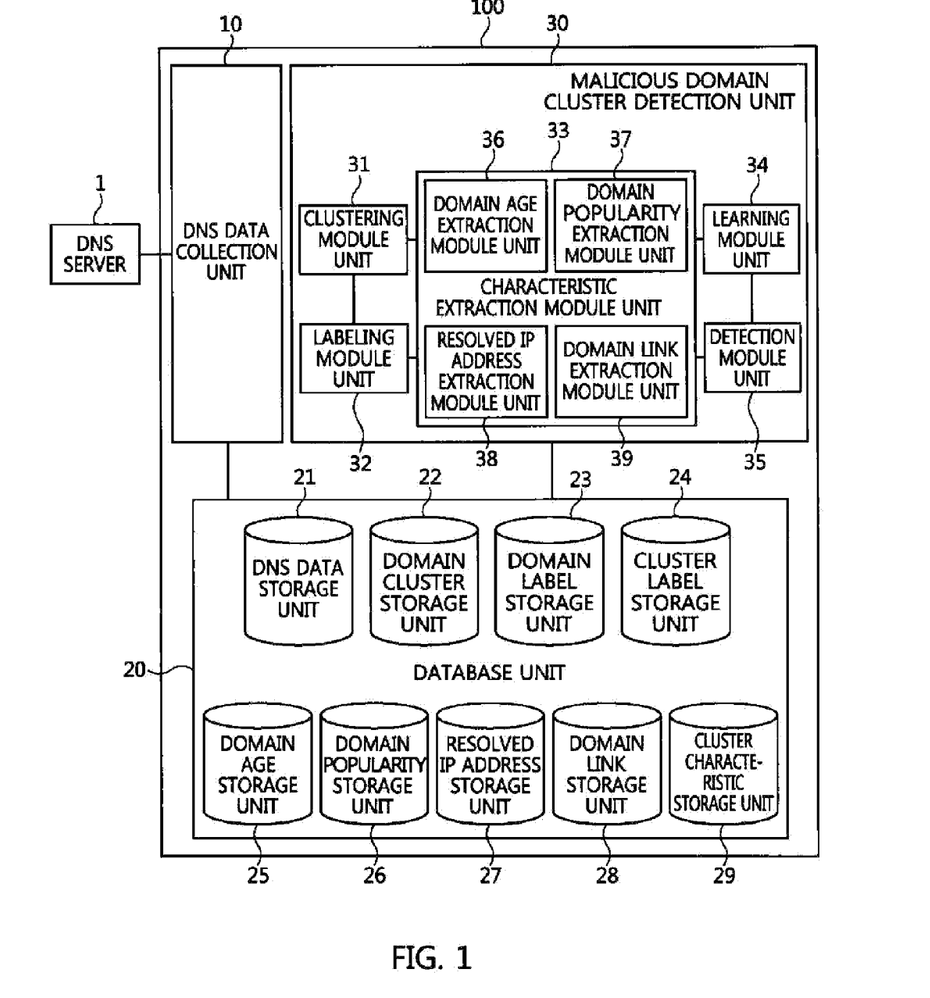
FIG. 1 is a configuration diagram illustrating an apparatus for detecting a malicious domain cluster according to an embodiment of the present invention.

FIG. 1 is a configuration diagram illustrating an apparatus for detecting a malicious domain cluster according to an embodiment of the present invention.

The apparatus 100 for detecting a malicious domain cluster according to the present embodiment includes a DNS data collection unit 10, a database unit 20, and a malicious domain cluster detection unit 30.

The DNS data collection unit 10 collects traffic exchanged between a client and a recursive name server using a passive DNS replication method. In this case, the passive DNS replication method refers to a method of connecting a network tapping apparatus (not illustrated) to a crossroad at which network traffic moves to a DNS server 1 and allowing the network tapping apparatus to replicate and deliver network traffic that comes from and goes to the DNS server 1 in real time.

Network traffic delivered from the network tapping apparatus to the DNS data collection unit 10 includes TCP traffic data and UDP traffic data. The UDP traffic data includes DNS traffic data (UDP 53 port).

Accordingly, the DNS data collection unit 10 extracts only DNS traffic from received network traffic, and store only DNS data, obtained by processing the DNS traffic, in the DNS data storage unit 21 of the database unit 20. In this case, the DNS data includes the times at which a domain query and a response were made, a hash value anonymously generated using a client IP address used to query a domain, a queried domain name, a domain response type, a domain response value, and the time to live (TTL) value of the domain. The domain response value includes a domain return IP address and a domain canonical name.

The malicious domain cluster detection unit 30 may generate a domain cluster based on the DNS data collected by the DNS data collection unit 10, may learn the characteristics of a normal cluster and a malicious cluster in the domain cluster, and may detect whether the domain cluster is malicious based on the result of the learning. For this purpose, the malicious domain cluster detection unit 30 includes a clustering module unit 31, a labeling module unit 32, a characteristic extraction module unit 33, a learning module unit 34, and a detection module unit 35.

The clustering module unit 31 performs the task of grouping domains exhibiting group activities into a cluster. In other words, in order to group the domains exhibiting group activities, the clustering module unit 31 represents domains in the form of an IP address list of hosts that have queried the corresponding domain for a specific period (e.g., one day). Next, the clustering module unit 31 calculates similarities in the host IP address between the domains, and groups domains having similar host IP address lists into a cluster. In order to group the domains having similar host IP address lists into a cluster, a clustering algorithm (e.g., CLOPE) in the data mining field may be used. A cluster generated as a result of the running of the clustering algorithm includes a set of domains exhibiting group activities (i.e., having similar host IP address lists). The clustering module unit 31 stores the generated domain cluster in the domain cluster storage unit 22 of the database unit 20.

In other words, the clustering module unit 31 may generate a domain cluster by grouping domains exhibiting group activities into the domain cluster using DNS data collected by the DNS data collection unit 10. In this case, one or more domain clusters may be generated.

The labeling module unit 32 assigns a malicious or normal cluster label to a domain cluster generated by the clustering module unit 31 in order to prepare a domain cluster to be used for learning. In order to assign the malicious or normal cluster label to the domain cluster, first, whether domains within the domain cluster are malicious needs to be determined. For this purpose, an external domain evaluation service (e.g., SiteAdvisor of McAfee, SafeWeb of Norton, or SafeBrowsing of Google) may be used. The external domain evaluation service provides notification of one of the four domain labels, for example, "Dangerous", "Suspicious", "Unknown", and "Safe" with respect to a specific domain. The labeling module unit 32 stores a domain label checked by the external domain evaluation service in the domain label storage unit 23 of the database unit 20. A domain determined to be dangerous by the external domain evaluation service may be considered to be a malicious domain, and a domain determined to be used for a safe purpose by the external domain evaluation service may be considered to be a normal domain.

Additional criteria for determining which domain cluster will be considered to be malicious or normal are required because malicious and normal domains may be mixed in a domain cluster even when whether the domains of the domain cluster are malicious has been determined. A malicious cluster may be defined using one of the following two criteria (i.e., malicious cluster classification criteria).

1. A domain cluster is defined as a malicious cluster if a specific percentage (e.g., 50%) or more of domains within the domain cluster are malicious domains.

2. A domain cluster is defined as a malicious cluster if domains within the domain cluster include at least a few (e.g., 2) malicious domains and do not include any normal domain.

Furthermore, likewise, a normal cluster may be defined using one of the following two criteria (i.e., normal cluster classification criteria).

1. A domain cluster is defined as a normal cluster if a specific percentage (e.g., 50%) or more of domains within the domain cluster are normal domains.

2. A domain cluster is defined as a normal cluster if domains within the domain cluster include a few (e.g., 2) normal domains and do not include any malicious domain.

In addition, a domain cluster including both normal and malicious domains may be defined as a mixed cluster, and a mixed cluster label may be assigned thereto. A case where the states of all the domains of a domain cluster are unknown may be defined as an unknown cluster, and an unknown cluster label may be assigned thereto.

Accordingly, the labeling module unit 32 may assign a cluster label to a domain cluster using domain labels and the cluster classification criteria (i.e., the normal cluster classification criteria, and the malicious cluster classification criteria), and may store the cluster label in the cluster label storage unit 24 of the database unit 20. That is, the labeling module unit 32 may assign a corresponding cluster label to a domain cluster depending on one of the malicious cluster classification criteria and the normal cluster classification criteria that are satisfied by domains within the domain cluster.

The characteristic extraction module unit 33 extracts a cluster characteristic different with respect to malicious and normal clusters based on a domain cluster generated by the clustering module unit 31, and stores the cluster characteristic in the cluster characteristic storage unit 29 of the database unit 20. In this case, the cluster characteristic is subsequently used when the learning module unit 34 learns malicious and normal clusters and the detection module unit 35 sorts malicious domain clusters.

The characteristic extraction module unit 33 may include a domain age extraction module unit 36, a domain popularity extraction module unit 37, a resolved IP address extraction module unit 38, and a domain link extraction module unit 39. The domain age extraction module unit 36, the domain popularity extraction module unit 37, the resolved IP address extraction module unit 38, and the domain link extraction module unit 39 are called detailed characteristic extraction modules. Each of the detailed characteristic extraction modules extracts a characteristic item. In this case, characteristic items different with respect to malicious and normal clusters may include domain ages, domain popularities, resolved IP addresses, and domain links. The cluster characteristics include all the characteristic items, and each of the characteristic items is represented in the form of a vector.

The domain age extraction module unit 36 extracts a domain age characteristic item, and stores the extracted domain age characteristic item in the domain age storage unit 25 of the database unit 20. The domain age characteristic item includes the average of domain ages within a domain cluster and the standard deviation of the domain ages. In this case, each of the domain ages may be measured using the time difference (e.g., days) between, the time at which a domain was registered and the time the domain is monitored. The facts that a malicious cluster has a larger number of domains that have been registered for shorter periods than the domains of a normal cluster and the domains of a malicious cluster have age values in a similar range are used for cluster classification.

The domain popularity extraction module unit 37 extracts a domain popularity characteristic item, and stores the extracted domain popularity characteristic item in the domain popularity storage unit 26 of the database unit 20. The domain popularity characteristic item may include the average of the domain popularities within a domain cluster and the standard deviation of the domain popularities. In this case, each of the domain popularities may be measured using an external service (e.g., Alexa) provided by measuring the popularity ranking of a domain based on a domain history. The facts that a malicious cluster has a larger number of domains that are less famous than those of a normal cluster and the domains of a malicious cluster have popularity ranking values in a similar range are used for cluster classification.

The resolved IP address extraction module unit 38 extracts a resolved IP address characteristic item, and stores the extracted resolved IP address characteristic item in the resolved IP address storage unit 27 of the database unit 20. The resolved IP address characteristic item includes values regarding how many domains of a domain cluster are resolved into various IP addresses and how many resolved IP addresses are connected to various countries, BGP Prefix, ASN, and Registry. The fact that a malicious cluster is chiefly connected to countries, BGP Prefix, ASN, and Registry that are less various than those of a normal cluster in the cases other than a case where a FastFlux scheme is used is used for cluster classification.

The domain link extraction module unit 39 extracts a domain link characteristic item, and stores the extracted domain link characteristic item in the domain link storage unit 28 of the database unit 20. The domain link characteristic item includes the average of domain links within a domain cluster and the standard deviation of the domain links. In this case, each of the domain links refers to the number of a link that indicates a corresponding domain from other web pages, and may be measured using a search operator provided by a search engine (e.g., Google, Bing, or Yahoo). In general, a malicious cluster has the number of links less than that of a normal cluster. The fact that the domains of a malicious cluster have link values in a similar range is used for cluster classification.

In FIG. 1, the learning module unit 34 performs learning using input cluster labels and input cluster characteristics. In this case, any specific 2-class learning algorithm (e.g., a decision tree or Random Forest) in the field of machine learning may be used for the learning. When such learning is performed, an under sampling scheme is used in order to control the ratio between the number of malicious clusters and the number of normal clusters.

In other words, the learning module unit 34 may perform machine learning on a malicious cluster and a normal cluster based on the cluster labels and characteristics of a domain cluster generated by the clustering module unit 31.

The detection module unit 35 determines whether a domain cluster is malicious or normal using the characteristic of a domain cluster having no label or an unknown label based on the content learnt by the learning module unit 34.

In other words, the detection module unit 35 may detect a malicious cluster in domain clusters using classification rules in the learning module unit 34. In this case, the classification rules in the learning module unit 34 may be considered to be rules for detecting a malicious domain cluster.

In FIG. 1, the detection module unit 35 and the learning module unit 34 are illustrated as being functionally separate from each other. In actual implementations, the learning module unit 34 and the detection module unit 35 may be integrated into a single unit because the detection module unit 35 uses the classifier of a learning algorithm that is the same as that of the learning module unit 34.

At least one embodiment of the present invention may have the following two advantages because domains are not detected using an existing single domain detection method but are collectively detected on a per-cluster basis.

First, the number of cases where some of all malicious domains are not detected can be reduced if the malicious domains are collectively used for a specific attack because the malicious domains are detected in a cluster form. In a single domain detection method, some of the domains that are collectively used may not be detected because the association between the domains is not taken into consideration when each of the domains is detected. In this case, if any one domain is not detected, a communication channel between a Botnet and a C&C server may continue to be maintained through the not detected domain, and a list of previously detected malicious domains may be newly updated with a list of domains having another name using the communication channel. As a result, the detected domains may be invalidated. Accordingly, in order to eradicate a corresponding attack, it is important to detect all related domains at once. If an embodiment of the present invention in which associated domains that have been collectively used for an attack are grouped into a cluster and a malicious cluster is detected is used, all the associated domains can be detected without missing some domains because the associated domains are grouped into a cluster.

Next, a method by which malicious domains that have been collectively used for an attack are used may be analyzed by detecting the malicious domains in a cluster form. Additional information based on a macroscopic viewpoint may be extracted from the association between domains within a domain cluster in addition to information that may be obtained from individual malicious domains detected using the single domain detection method. For example, how domain character strings have been arranged in malicious domains within a detected malicious cluster, how servers connected to malicious domains have been locally distributed, and what hosts within a network have been infected may be checked. A tendency with which attackers use malicious domains may be analyzed based on information extracted as described above, and the results of the analysis may be used to prepare a countermeasure against a future attack.

The database unit 20 includes the DNS data storage unit 21, the domain cluster storage unit 22, the domain label storage unit 23, the cluster label storage unit 24, the domain age storage unit 25, the domain popularity storage unit 26, the resolved IP address storage unit 27, the domain link storage unit 28, and the cluster characteristic storage unit 29.

Figure 2:
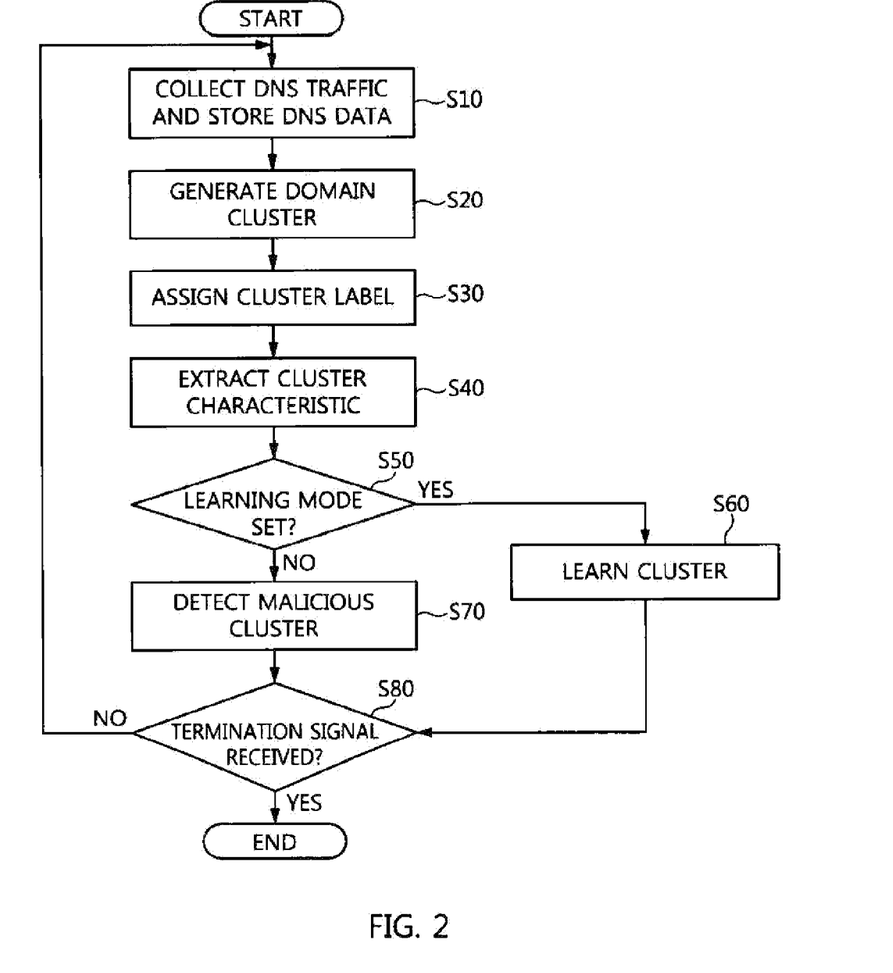
FIG. 2 is a flowchart illustrating a method of detecting a malicious domain cluster according to an embodiment of the present invention.

FIG. 2 is a flowchart illustrating a method of detecting a malicious domain cluster according to an embodiment of the present invention.

First, the DNS data collection unit 10 collects DNS traffic over a network and stores only DNS data obtained by processing the DNS traffic in the DNS data storage unit 21 of the database unit 20 at step S10.

The clustering module unit 31 of the malicious domain cluster detection unit 30 generates a domain cluster by grouping domains exhibiting group activities into the domain cluster based on the DNS data stored in the database unit 20 at step S20. The clustering module unit 31 stores the generated domain cluster in the domain cluster storage unit 22 of the database unit 20.

Furthermore, the labeling module unit 32 of the malicious domain cluster detection unit 30 assigns a malicious or normal cluster label to the domain cluster stored in the database unit 20 at step S30. In this case, in order to assign the cluster label to the domain cluster, first, the labeling module unit 32 assigns domain labels to the domains of the domain cluster. A malicious label may also be assigned to a domain cluster that was detected as being malicious by the detection module unit 35 in the past. The cluster label assigned as described above is stored in the cluster label storage unit 24 of the database unit 20.

Next, the characteristic extraction module unit 33 of the malicious domain cluster detection unit 30 extracts a cluster characteristic different with respect to malicious and normal clusters from the domain cluster stored in the database unit 20 at step S40. In this case, the characteristic extraction module unit 33 may extract information about domain ages, domain popularities, resolved IP addresses, and domain links as characteristic items. The characteristic extraction module unit 33 generates a cluster characteristic by synthesizing the characteristic items. The extracted domain age characteristic item, domain popularity characteristic item, resolved IP address characteristic item, and domain link characteristic item are stored in the domain age storage unit 25, domain popularity storage unit 26, resolved IP address storage unit 27, and domain link storage unit 28 of the database unit 20. The generated cluster characteristic is stored in the cluster characteristic storage unit 29.

Next, the malicious domain cluster detection unit 30 determines whether learning mode has been set at step S50.

If, as a result of the determination at step S50, it is determined that the learning mode has been set ("Yes"), the learning module unit 34 is enabled. Accordingly, the learning module unit 34 learns malicious and normal clusters by referring to the cluster label and cluster characteristic stored in the database unit 20 at step S60.

If, as a result of the determination at step S50, it is determined that the learning mode has been set ("No"), the detection module unit 35 is enabled. Accordingly, the detection module unit 35 detects a malicious cluster in the domain cluster stored in the database unit 20 at step S70. In this case, the domain cluster given to the detection module unit 35 as an input may be limited to a cluster having an unknown cluster label.

Next, the malicious domain cluster detection unit 30 determines whether a terminal signal has been received at step S80.

If, as a result of the determination at step S80, it is determined that the termination signal has not been received, the process returns to step S10 and processes following the collection of the DNS traffic are repeated. Through such a repetition, the learning module unit 34 may update rules for the detection of a malicious domain cluster according to an environment by continuously learning a newly generated domain cluster. Accordingly, the detection module unit 35 may detect a new attack based on the results of the learning module unit 34.

If, as a result of the determination at step S80, it is determined that the termination signal has been received, the process is terminated.

Figure 3:
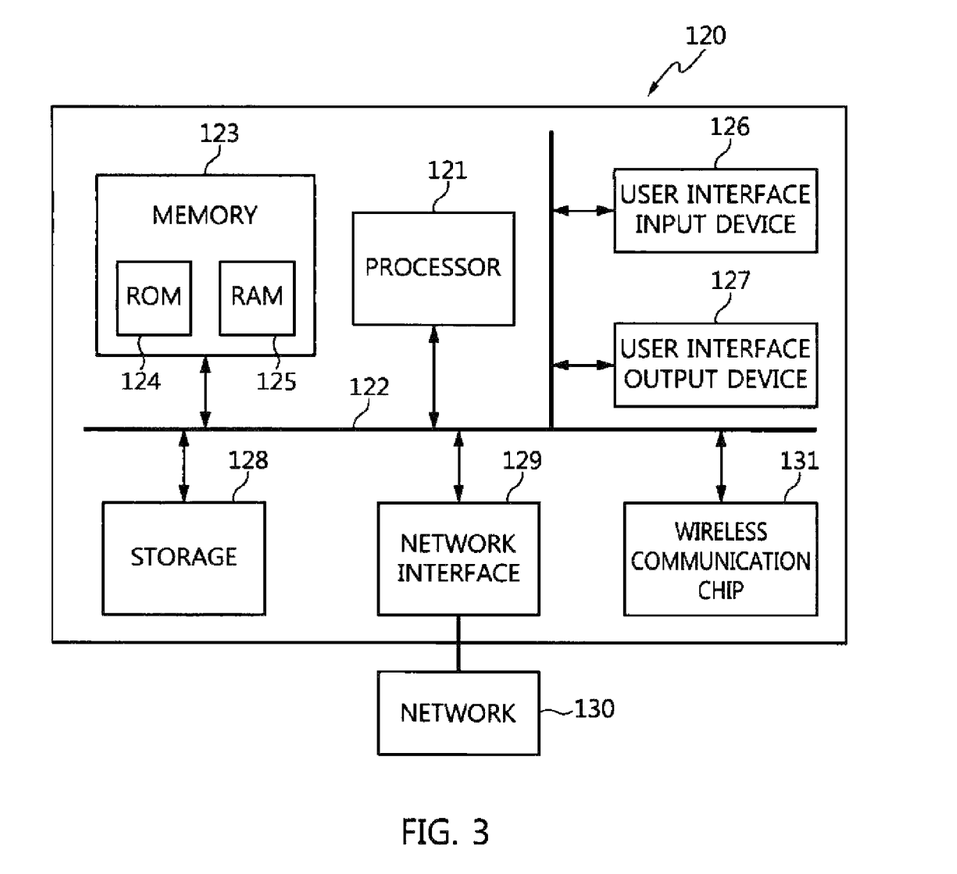
FIG. 3 is a diagram illustrating a computer system in which an embodiment of the present invention has been implemented.

The aforementioned embodiment of the present invention may be implemented in a computer system. As illustrated in FIG. 3, a computer system 120 may include one or more processors 121, one or more pieces of memory 123, one or more user interface input devices 126, one or more user interface output devices 127, and one or more pieces of storage 128 that communicate with each other over a bus 122. The computer system 120 may further include one or more network interfaces 129 connected to a network 130. The processor 121 may be a semiconductor device for executing processing instructions stored in a central processing unit, the memory 123, or the storage 128. The memory 123 and the storage 128 may include a variety of types of volatile or non-volatile storage media. For example, the memory 123 may include ROM 124, RAM 125 or both.

The computer system 120 may further include a wireless communication chip (e.g., a Wi-Fi chip) 131.

When computer-readable instructions are executed by the processor, they may execute a method according to at least one of the embodiments of the present invention.

In accordance with at least an embodiment of the present invention, the number of cases where some of all malicious domains that are collectively used are not detected when an attack using the malicious domains is detected can be reduced.

Furthermore, a method by which malicious domains are used can be analyzed.

Furthermore, although an attack that collectively uses malicious domain includes only malicious domains not included in an existing black list, the attack can be detected using the characteristic of the malicious domains that appears for each cluster.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for detecting a malicious domain cluster, comprising:
   a domain name server (DNS) data collection unit configured to collect DNS traffic over a network and store the DNS traffic in a database; and
   a malicious domain cluster detection unit configured to generate a domain cluster based on the DNS data, learn characteristics of normal and malicious clusters in the domain cluster, and detect whether the domain cluster is malicious based on a result of the learning,
   wherein the malicious domain cluster detection unit is configured to comprise:
   a clustering module unit configured to generate the domain cluster by grouping domains, exhibiting group activities, into the domain cluster based on the DNS data;
   a labeling module unit configured to assign a malicious or normal cluster label to the generated domain cluster;
   a characteristic extraction module unit configured to extract a cluster characteristic different with respect to the malicious and normal clusters based on the generated domain cluster;
   a learning module unit configured to learn the malicious and normal clusters based on the cluster label and the cluster characteristic; and
   a detection module unit configured to detect whether the domain cluster is malicious based on a result of the learning of the learning module unit; and
   wherein the characteristic extraction module unit comprises:
   a domain age extraction module unit configured to extract an average of domain ages within the domain cluster and a standard deviation of the domain ages as a characteristic item;
   a domain popularity extraction module unit configured to extract an average of domain popularities within the domain cluster and a standard deviation of the domain popularities as a characteristic item;
   a resolved IP address extraction module unit configured to extract resolved IP addresses of the domains of the domain cluster as a characteristic item; and
   a domain link extraction module unit configured to extract an average of web page links indicative of the domains of the domain cluster and a standard deviation of the web page links as a characteristic item.

2. The apparatus of claim 1, wherein in order to group the domains, exhibiting group activities, into the domain cluster, the clustering module unit is configured to represent each of the domains in a form of a list of IP addresses of hosts that have queried the corresponding domain for a specific period, calculate similarities of host IP address lists of the domains, and group domains having similar host IP address lists into a cluster.

3. The apparatus of claim 1, wherein the labeling module unit is configured to assign a cluster label to the domain cluster based on the domain label and a cluster classification criterion.

4. The apparatus of claim 3, wherein in order to assign the cluster label, the labeling module unit is configured to check whether the domains of the domain cluster are malicious based on domain labels via an external domain evaluation service.

5. The apparatus of claim 4, wherein the labeling module unit is configured to consider a corresponding domain to be a malicious domain if the domain label is indicative of danger and consider a corresponding domain to be a normal domain if the domain label is indicative of safety.

6. The apparatus of claim 3, wherein the labeling module unit is configured to determine a cluster classification criterion defining that the domain cluster is a malicious cluster to be satisfied if a specific percentage or more of the domains of the domain cluster are malicious domains and then assign a corresponding cluster label to the domain cluster.

7. The apparatus of claim 3, wherein the labeling module unit is configured to determine a cluster classification criterion defining that the cluster domain is a malicious cluster if a preset minimum or larger number of malicious domains are included in the domains of the domain cluster and a normal domain is not present to be satisfied and then assign a corresponding cluster label to the domain cluster.

8. The apparatus of claim 3, wherein the labeling module unit is configured to determine a cluster classification criterion defining that the cluster domain is a normal cluster if a specific percentage or more of the domains of the domain cluster are normal domains to be satisfied and then assign a corresponding cluster label to the domain cluster.

9. The apparatus of claim 3, wherein the labeling module unit is configured to determine a cluster classification criterion defining that the domain cluster is a normal cluster if a preset minimum or large number of normal domains are included in the domains of the domain cluster and a malicious domain is not present to be satisfied and then assign a corresponding cluster label to the domain cluster.

10. The apparatus of claim 1, wherein the learning module unit is configured to update a rule for detection of a malicious domain cluster by continuously learning a newly generated domain cluster.

11. The apparatus of claim 1, wherein the DNS data collection unit is configured to extract only DNS traffic data from network traffic and store only DNS data obtained by processing the DNS traffic data in the database.

12. The apparatus of claim 11, wherein the DNS data comprises times at which a domain query and response are made, a hash value anonymously generated using a client IP address used to query a domain, a queried domain name; a domain response type; a domain response value, and a time to live (TTL) value of the domain.

13. A method of detecting a malicious domain cluster, comprising:
  collecting, by a DNS data collection unit, DNS traffic over a network and storing, by the DNS data collection unit, processed DNS data in a database;
  generating, by a malicious domain cluster detection unit, a domain cluster based on the DNS data;
  learning, by the malicious domain cluster detection unit, characteristics of normal and malicious clusters in the domain cluster; and
  detecting, by the malicious domain cluster detection unit, whether the domain cluster is malicious based on a result of the learning;
  wherein the method comprises between generating the domain cluster and learning the characteristics;
  assigning, by the malicious domain cluster detection unit, a malicious or normal cluster label to the generated domain cluster; and
  extracting, by the malicious domain cluster detection unit, a cluster characteristic different with respect to the malicious and normal clusters based on the generated domain cluster;
  wherein learning the characteristics comprises learning the malicious and normal clusters based on the cluster label and the cluster characteristic; and
  wherein extracting the cluster characteristics comprises extracting an average of domain ages within the domain cluster and a standard deviation of the domain ages, an average of domain popularities within the domain cluster and a standard deviation of the domain popularities, resolved IP addresses of the domains within the domain cluster as a characteristic item, and an average of web page links indicative of the domains within the domain cluster and a standard deviation of the web page links as characteristic items.

14. The method of claim 13, wherein assigning the cluster label comprises:
  checking whether domains within the domain cluster are malicious based on domain labels via an external domain evaluation service; and
  assigning the cluster label to the domain cluster based on the domain labels and a cluster classification criterion.

15. The method of claim 14, wherein assigning the cluster label comprises assigning a malicious cluster label corresponding to a malicious cluster to the domain cluster if a specific percentage or more of the domains of the domain cluster are malicious domains or if a preset minimum or large number of malicious domains are included in the domains of the domain cluster and a normal domain is not present.

16. The method of claim 14, wherein assigning the cluster label comprises assigning a cluster label corresponding to a normal cluster to the domain cluster if a specific percentage or more of the domains of the domain cluster are normal domains or if a preset minimum or larger number of normal domains are included in the domains of the domain cluster and a malicious domain is not present.

* * * * *